United States Patent
Kelly et al.

(10) Patent No.: US 12,339,786 B2
(45) Date of Patent: Jun. 24, 2025

(54) TECHNIQUES FOR GENERATING UNIQUE IDENTIFIERS FOR TRACKING PROCESS ACTIVITY

(71) Applicant: CrowdStrike, Inc., Sunnyvale, CA (US)

(72) Inventors: Martin Kelly, Bothell, WA (US); Marco Vedovati, Albino (IT); Igor Polevoy, San Jose, CA (US); Milos Petrbok, Redmond, WA (US); Christopher White, Avon, NY (US)

(73) Assignee: CrowdStrike, Inc., Sunnyvale, CA (US)

( * ) Notice: Subject to any disclaimer, the term of this patent is extended or adjusted under 35 U.S.C. 154(b) by 258 days.

(21) Appl. No.: 18/081,149

(22) Filed: Dec. 14, 2022

(65) Prior Publication Data

US 2024/0202134 A1    Jun. 20, 2024

(51) Int. Cl.
| | |
|---|---|
| *G06F 21/00* | (2013.01) |
| *G06F 1/14* | (2006.01) |
| *G06F 9/54* | (2006.01) |
| *G06F 12/1009* | (2016.01) |

(52) U.S. Cl.
CPC ............ *G06F 12/1009* (2013.01); *G06F 1/14* (2013.01); *G06F 9/544* (2013.01)

(58) Field of Classification Search
CPC ........ G06F 12/1009; G06F 1/14; G06F 9/544; G06F 12/1491; G06F 2212/1008; G06F 11/3466
See application file for complete search history.

(56) References Cited

U.S. PATENT DOCUMENTS

| | | | | |
|---|---|---|---|---|
| 11,675,897 | B2 * | 6/2023 | Regner | G06F 11/0793 726/23 |
| 11,709,720 | B1 * | 7/2023 | Fournier | G06F 9/545 719/318 |
| 2008/0209249 | A1 * | 8/2008 | Tso | G06F 9/54 713/400 |
| 2019/0370360 | A1 * | 12/2019 | Mainali | G06F 3/067 |
| 2020/0366571 | A1 * | 11/2020 | Vittal | H04L 41/5032 |
| 2023/0259156 | A1 * | 8/2023 | Jong | H04J 3/0685 713/400 |

* cited by examiner

*Primary Examiner* — Ghazal B Shehni
(74) *Attorney, Agent, or Firm* — Womble Bond Dickinson (US) LLP

(57) ABSTRACT

A method includes retrieving, in a kernel space of an operating system executing on a computing device, a first value from a first clock source, retrieving, in a user space of the operating system executing on the computing device, a second value from a second clock source, generating a unique process identifier (UPID) associated with a process identifier (PID) of a process executing in the operating system, wherein the UPID is based on the first value of the first clock source and the second value of the second clock source, and tracking process activity of the process executing in the operating system by utilizing the UPID.

17 Claims, 8 Drawing Sheets

ND STATES PATENT

TECHNIQUES FOR GENERATING UNIQUE IDENTIFIERS FOR TRACKING PROCESS ACTIVITY

TECHNICAL FIELD

Aspects of the present disclosure relate to tracking process activity in an operating system, and more particularly, to tracking process activity utilizing pseudo-unique process identifier mapping.

BACKGROUND

For security purposes, it may be beneficial to track activities of processes executing on an operating system. In some cases, the activity may be tracked over long periods of time, such as weeks or months. Such a tracking history may allow for forensic analysis in the event an issue is detected. In some cases, analysis of the activity may help identify signatures of malicious programs, also known as malware.

When tracking activity over long periods of time, it may be useful to be able to uniquely identify a particular process. Tracking a process, however, has complexities. An operating system may generate a process identifier (ID), also referred to as a PID, for each process created. However, the number of process IDs may be finite. For example, an operating system may allow for millions, e.g., four million, process IDs. Even with this many process IDs, the process ID limit may be reached. In such cases, the operating system may begin reusing process IDs. This can create problems for tracking processes, since a given process ID may not uniquely map to a particular process due to the reuse. For example, a process ID of 1006 may map to a first process at one time and to a second process at a different time.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the scope of the described embodiments.

DETAILED DESCRIPTION

Figure 1:
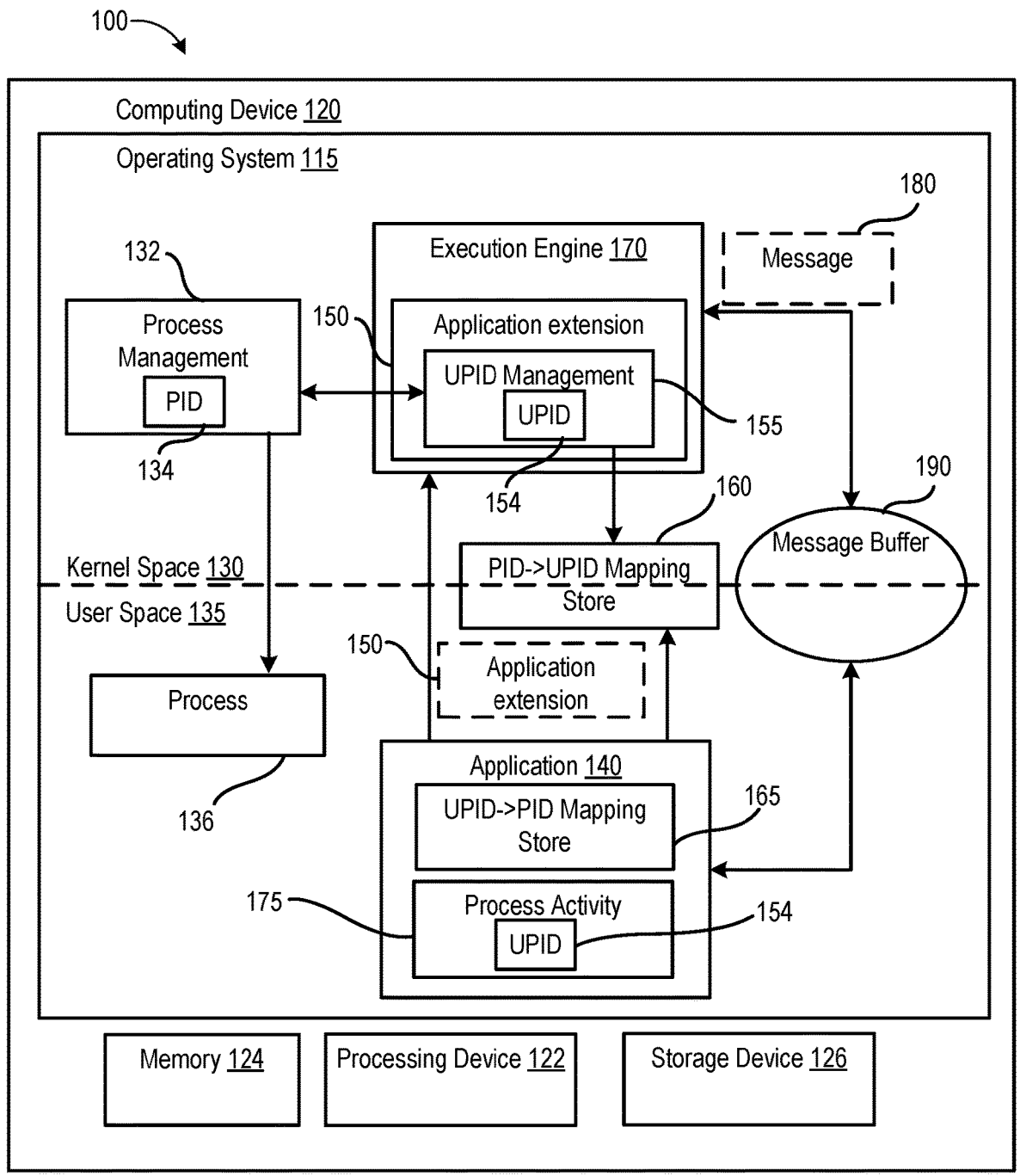
FIG. 1 is a block diagram that illustrates an example system, according to some embodiments of the present disclosure.

Many modern operating systems are separated into a user space and a kernel space. The kernel space is typically more privileged, and may execute operations with an administrative privilege level that is protected from general access. One way to extend the functionality of an operating system (OS) may include the use of kernel drivers. Kernel modules may be separate modules which may be loaded into the operating system and executed with the administrative privilege level of the kernel within a structured framework. Kernel modules offer a way for those wishing to extend the functionality of the OS, such as hardware providers, to execute privileged operations.

In some scenarios, it may be beneficial to allow for execution of privileged operations through a more dynamic and/or secure interface than kernel drivers. One such mechanism is the extended Berkeley packet filter (eBPF). Infrastructure such as eBPF allows applications executing in user space to provide operational logic to be executed within the kernel space of the operating system. Such access, however, may be limited in functionality to increase security and reliability. For example, environments such as eBPF may limit the types of access and/or instructions that may be executed within the kernel space, which may limit the types of operations that may be performed in such environments. For example, the code that is to be run in the kernel space may be denied access to certain functionality, such as access to fully-functional atomic operations and/or device structures, such as random number generators.

In some cases, it may be useful for the code that is being run in the kernel to be able to uniquely track processes being executed. For example, security architectures may track behavior and/or transactions performed by a process to determine if they are malicious. In some cases, the ability to track a process may extend beyond the life of the process. For example, if a security problem is detected, it may be useful to be able to track prior-executed processes to determine if they contributed to, or affected by, the security problem.

As previously described, however, tracking a problem over longer periods of time may run into situations where process identifiers (PIDs) are reused by the operating system. To overcome this problem, a unique process ID, also referred to as a UPID, may be generated to be associated with the process ID. For example, a 64-bit value may be generated for each created process, which may accommodate up to $(2^{64}-1)$ or $(2^{(64-n)}-1)$ (if n bits are reserved, e.g., n=1) process IDs. As new processes are created, a new UPID may be created that is mapped to the PID of the new process. Security tracking may utilize the UPID for tracking the process rather than the PID so that the tracking may not be impacted by any potential reuse of PIDs.

In order to track the processes effectively, it may be useful to detect the creation of the processes in-line to the creation of the process (e.g., within the same stack of the system call used to create the process). As the processes are typically created in the kernel space of the operating system, it may be useful to place the code to track the process creation and generate UPIDs within the kernel space utilizing an infrastructure such as eBPF, which may allow for code to be provided to the kernel space for execution. As will be discussed further herein, UPID generation may be provided as eBPF code to detect the creation of the process and generate an associated UPID mapped to the PID of the created process. Once the UPID is generated, however, it may be complex to communicate the mapping to applications in the user space of the operating system. The eBPF infrastructure may be limited in the types of operations it can execute and/or the ways it can communicate the generated UPID to the user space. Therefore, applications in user space that need to map a UPID to a PID frequently may suffer performance impacts if the UPID to PID mapping were to be maintained solely in the eBPF environment.

In addition, the generation of the UPID may have its own challenges. In order to be unique, it may be necessary to generate a number that will not be likely reused. For example, simply reusing a number that increments over time may have difficulties in certain operating environments. For example, some operating systems may be virtual machines and/or container infrastructures that may be restored and/or restarted over time. Therefore, a value which simply increments over time may be subject to reuse if the operating system is restored from an earlier checkpoint. Similarly, a UPID based on a pseudo-random number may generate the same numbers if seeded with the same value. Therefore, a system which was restored from a checkpoint might generate the same series of pseudorandom numbers. These problems may be escalated in architectures similar to eBPF. In such environments, some mechanisms may not be available to executing code instructions. For example, eBPF programs may not be able to access hardware randomization interfaces and/or fully-functional atomic operations which may be useful to generating UPIDs.

The present disclosure addresses the above-noted and other deficiencies by providing a technique for generating a UPID by kernel-space code, such as that in an eBPF environment, and tracking the PID to UPID mapping. In some embodiments described herein, a PID to UPID mapping may be maintained in kernel-space code and shared with user-space code utilizing a shared memory mapping. A separate UPID to PID mapping may be maintained in user-space based on messages from the kernel-space to user-space. In addition, embodiments described herein may provide techniques for UPID generation that may be successful despite lacking access to certain functions. In some embodiments of the present disclosure, kernel-space code may utilize combinations of accessible interfaces to generate a UPID that is sufficiently unique to meet reasonable requirements for security tracking.

Allowing for a PID to UPID mapping in user space may reduce an amount of calls made to the kernel to access a particular mapping, which may result in an improved performance with respect to the operation of the computer. Moreover, it may be useful to have a UPID to PID mapping that extends beyond the life of the underlying PID (e.g., after the process has exited). This allows applications within user space to have a consistent view of the current state of the system and access to data about UPIDs even if the underlying processes have already exited. In some cases, the UPID to PID mapping may be used for analyzing process activity in the abstract, decoupled from whether or not the underlying process is still active, or when the activity occurred. Were the UPID to PID mapping to be maintained within an eBPF infrastructure (e.g., in the kernel space), the eBPF infrastructure may erase the UPID to PID mapping when the underlying process exits, which may prematurely remove the mapping from being accessed by those applications in user space that may wish to track information about processes that have already exited. By having the UPID to PID mapping within user space, the mapping may be decoupled from the timing of the process activity in the operating system kernel.

In contrast, it may be beneficial to maintain the reverse mapping, from PID to UPID, in kernel space. It may be beneficial to utilize the PID to UPID mapping to maintain a consistent state of the operating system 115 as it is executing, in order to take action on the computing device 120 (e.g., killing a process, checking its current state, etc.). Since this concerns the actual system state, keeping it current (e.g., taking action when a process is created or destroyed) may be more effective if done timely and, as a result, may be more effectively performed in kernel space, e.g., by eBPF code.

As used herein, a unique PID may refer to a value (a UPID) that can be associated with a process and/or a PID and is sufficiently unique so as to uniquely identify that process and/or PID for a reasonable timeframe. For example, though a unique PID may eventually be reused, a unique PID may not be reused over a reasonable timeframe over which the unique PIDs are to be analyzed. As a non-limiting example, the timeframe may be three months or more, six month or more, or a year or more, depending on the underlying functionality being supported. This type of uniqueness may also be referred to as a pseudo-unique value and/or a probabilistically unique value. A UPID of a size described herein may still be exposed to reuse (e.g., a value that wraps) given a long enough time of operation. However, as used herein, the term "unique" is not to imply a limitation to only those embodiments in which a value is strictly unique over an infinite timespan. Stated another way, the use of the term "unique" used within the specification and the claims is not intended to limit interpretations of the embodiments to values which are strictly unique (i.e., incapable of being reused over an infinite timespan). In some embodiments, UPID uniqueness is defined with respect to a particular computing device 120. For example, a given UPID value may be used to represent different processes on different computing devices.

The embodiments described herein provide improvements over some process tracking techniques utilized in infrastructures similar to eBPF. The techniques described herein provide for the generation of UPIDs and mappings between the UPIDs and their associated PIDs, that may be shared between the kernel space and user space of the operating system. In addition, embodiments described herein provide improved techniques for generating a UPID that may work in environments having limited functionality, such as eBPF. This may allow for the generation of more robust UPIDs than some prior schemes. In this way, embodiments according to the present disclosure may provide a technological improvement that improves the operation of a computing device by allowing for the tracking of process creation for long-term analysis despite the potential for reuse of PIDs and/or improving the performance of a computing device that tracks UPIDs accurately.

Embodiments of the present disclosure provide an improvement to the technical field associated with operating systems, including the ability to uniquely identify executing and previously-executed processes. For example, the embodiments of the present disclosure reduce an amount of resources needed to uniquely track processes by shifting portions of the mapping from kernel space to user space, reducing an overhead of processing operations needed to access portions of the mappings. Moreover, embodiments of the present disclosure provide techniques for generating unique PIDs within restricted environments, such as eBPF, which allows for the generation of unique PIDs to take place even in environments lacking the types of operations that might otherwise be used for the generation of such unique PIDs. By moving portions of the generations of the unique PIDs into infrastructures such as eBPF, the processing and/or generation of the unique PIDs can take place in a secure environment without a requirement of excessive modification of the operating system kernel. Accordingly, the present disclosure sets forth systems, methods, and apparatuses that accommodate the generation of unique PIDs, and the tracking thereof, for tracking process activity over time and improve the functional operation of a computer and its associated operating system.

FIG. 1 is a block diagram that illustrates an example system 100, according to some embodiments of the present disclosure. FIG. 1 and the other figures may use like reference numerals to identify like elements. Thus, the same or similar numbers may be described with reference to other drawings even if they are neither mentioned nor described in the corresponding drawing. Also, elements that are not denoted by reference numbers may be described with reference to other drawings. A letter after a reference numeral, such as "110A," indicates that the text refers specifically to the element having that particular reference numeral. A reference numeral in the text without a following letter, such as "110," refers to any or all of the elements in the figures bearing that reference numeral.

As illustrated in FIG. 1, the system 100 includes a computing device 120. The computing device 120 may include hardware such as processing device 122 (e.g., processors, central processing units (CPUs)), memory 124 (e.g., random access memory (RAM), storage devices 126 (e.g., hard-disk drive (HDD)), and solid-state drives (SSD), etc.), and other hardware devices (e.g., sound card, video card, etc.).

In some embodiments, memory 124 may be non-uniform access (NUMA), such that memory access time depends on the memory location relative to processing device 122. It should be noted that although, for simplicity, a single processing device 122 is depicted in the computing device 120 depicted in FIG. 1, other embodiments of the computing device 120 may include multiple processing devices, storage devices, or other devices.

Processing device 122 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 122 may also include one or more special-purpose processing devices such as an application specific integrated circuit (ASIC), a field programmable gate array (FPGA), a digital signal processor (DSP), network processor, or the like.

The storage device 126 may comprise a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. In some embodiments, the storage device 126 may be used to store computer instructions which may implement one or more operations described herein. For example, the storage device 126 may store the computer instructions, which may be loaded into memory 124 and executed by the processing device 122.

The computing device 120 may comprise any suitable type of computing device or machine that has a programmable processor including, for example, server computers, desktop computers, laptop computers, tablet computers, smartphones, set-top boxes, etc. In some examples, the computing device 120 may comprise a single machine or may include multiple interconnected machines (e.g., multiple servers configured in a cluster). The computing device 120 may be implemented by a common entity/organization or may be implemented by different entities/organizations.

The computing device 120 may execute an operating system 115. The operating system 115 of computing device 120 may manage the execution of other components (e.g., software, applications, etc.) and/or may manage access to the hardware (e.g., processing device(s) 122, memory 124, and/or storage devices 126, etc.) of the computing device 120. Operating system 115 may be software to provide an interface between the computing hardware (e.g., processing device 122 and/or storage device 126) and applications running on the operating system 115. Operating system 115 may include a kernel space 130 and a user space 135, either or both of which can support the execution of one or more applications 140. Though only a single application 140 is illustrated in FIG. 1, it will be understood that a plurality of applications 140 may be present. Operating system kernel space 130 may include several operating system functionalities, including but not limited to process management, hardware interfaces, access control and the like. Functions executing within the kernel space 130 may execute with an elevated privilege and may manage the administration of the operating system 115. Examples of operating systems 115 include WINDOWS™, LINUX™, ANDROID™, IOS™, and MACOS™.

As illustrated in FIG. 1, computing device 120 may execute (e.g., using processing device 122) an application 140. Application 140 may be a desktop application, a network application, a security application, a database application, or any other application that may be executed by the operating system 115. Portions of an application 140 executing within the user space 135 may execute with a reduced privilege as compared to operations performed within the kernel space 130, and may be required to utilize standardized application programming interfaces (APIs), such as system calls, to access the functionality of the kernel space 130 of the operating system 115. In some embodiments, the application 140 may include functionality represented by an application extension 150 that is to be executed in the kernel space 130. The application extension 150 may be or include executable instructions that are provided by the application 140 to the kernel space 130 via an API, to be executed within the kernel space 130 utilizing the administrative privileges and/or access of the kernel space 130.

The application 140 may provide the application extension 150 to execution engine 170 within the kernel space 130. In some embodiments, the application extension 150 may be or include bytecode, though the embodiments of the present disclosure are not limited to such a configuration. In some embodiments, bytecode includes object code that may be converted to machine code (e.g., binary instructions compatible with processing device 122) by the execution engine 170.

The execution engine 170 may execute the application extension 150 within the context of the kernel space 130. For example, the execution engine 170 may execute the application extension 150 with the administrative privileges and access of the kernel space 130. This may allow the application extension 150 to perform privileged operations not available to the application 140 executing in user space 135. In some embodiments, the execution engine 170 may be part of an eBPF infrastructure executing within the kernel space 130 and the application extension 150 may be eBPF-compatible bytecode.

To assist in security of the operating system 115, the application extension 150 may be subject to certain limitations during its execution. For example, the application extension 150 may not have full access to all of the APIs available to other portions of the kernel space 130. In some embodiments, the application extension 150 may not have access to fully-functional atomic operations and/or hardware randomization devices.

In some embodiments, while executing, the application extension 150 may exchange one or more messages 180 with application 140. In some embodiments, the message 180 may be exchanged utilizing a message buffer 190. The application extension 150 may send message 180 into message buffer 190 for storage and the message 180 may be retrieved by the application 140. In some embodiments, the message 180 may be stored in memory (e.g., memory 124) allocated for the message buffer 190. In some embodiments, the message buffer 190 may be a ring buffer. A ring buffer includes data structures that utilize a linear buffer in memory that is accessed as if it were connected end-to-end (e.g., circularly). In some embodiments, a ring buffer may be accessed in a first-in-first-out (FIFO) manner.

The use of the message buffer 190 may allow the application extension 150 to exchange data and/or other message payloads with the application 140 using the messages 180. For example, the application extension 150 may perform a monitoring function that is capable of analyzing processes that are created within the privileged kernel space 130. The application extension 150 may be able to detect the creation of a process and inform the application 140 of the creation by using message 180.

In some embodiments, a UPID management engine 155 may execute within application extension 150. The UPID management engine 155 may be configured to monitor process creation within the operating system 115 and generate a unique process ID (UPID) 154 to track the created process in a pseudo-unique manner. For example, a process management engine 132 may execute within the kernel space 130 of the operating system 115. The process management engine 132 may be a portion of the operating system 115 responsible for creating, destroying, and/or tracking processes 136 executing on the computing device 120. When a request is made to generate a new process 136, the process management engine 132 may create the process 136 and generate a process ID (PID) 134 that is to be associated with the process 136.

As described herein, in some embodiments, the PID 134 may be a PID 134 that has been previously used for another process 136 that has since been destroyed. For example, the process management engine 132 may maintain uniqueness for PIDs 134 for the currently executing processes 136 of the operating system 115, but once a process 136 exits and/or is destroyed, the PID 134 for that process may be reused. In order to generate a pseudo-unique UPID 154 that may be unique over a longer period of time, the application extension 150 may be configured to generate a UPID 154 for each process 136 created by the process management engine 132. As part of generating the UPID 154, the UPID management engine 155 may maintain a process ID to unique ID (PID-to-UPID) mapping store 160.

Figure 2:
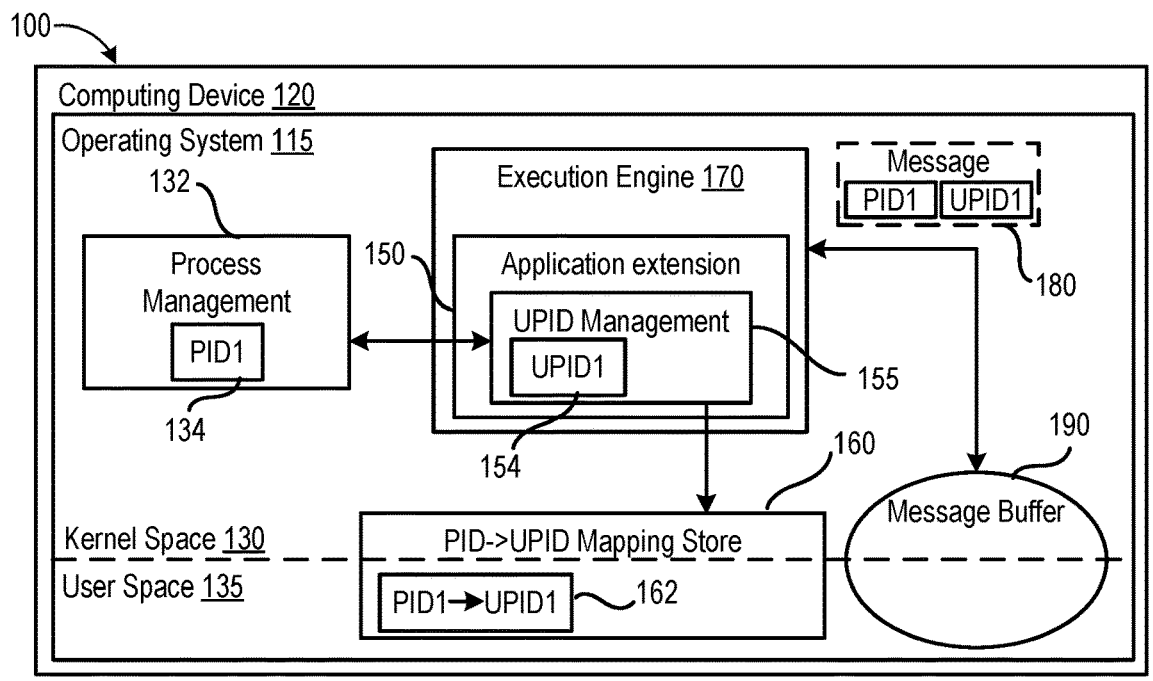
FIG. 2 is a block diagram illustrating an example of the creation of a unique process identifier (UPID) in response to the creation of a process, in accordance with some embodiments of the present disclosure.

FIG. 2 is a block diagram illustrating an example of the creation of a UPID 154 in response to the creation of a process, in accordance with some embodiments of the present disclosure. FIG. 2 is an example only, and is not intended to limit the embodiments of the present disclosure. A description of those elements of FIG. 2 that have been previously described will be omitted for brevity.

Referring to both FIGS. 1 and 2, as part of an operation of the application extension 150 within the execution engine 170, the application extension 150 may execute the UPID management engine 155. The UPID management engine 155 may monitor operations of the process management engine 132 to detect the creation of a process 136 (see FIG. 1). In the example shown in FIG. 2, the UPID management engine detects the creation of a process having process ID 134 having a value of PID1. PID1 is illustrated here as a reference value and is not intended to limit the value that may be used to refer to PID 134. In some embodiments, the PID 134 may be a numeric value.

Upon detection of the creation of the PID 134 having the value of PID1, the UPID management engine 155 may generate a UPID 154 having a value of UPID1. UPID1 is illustrated here as a reference value and is not intended to limit the value that may be used to refer to UPID 154. In some embodiments, the UPID 154 may be a numeric value. In some embodiments the UPID 154 may be a 64-bit value. Additional details for how a UPID may be generated will be provided herein.

Once created, the UPID management engine 155 may generate a PID-to-UPID mapping 162 that maps a PID value 134 to a UPID value 154, and place the PID-to-UPID mapping 162 within a PID-to-UPID mapping store 160. In some embodiments, the PID-to-UPID mapping 162 may allow for executing code instructions that have a value of a PID 134 to retrieve the value of a UPID 154 that corresponds to the PID 134. In some embodiments, the PID-to-UPID mapping store 160 may be a portion of memory that is accessible by the application 140 in user space 135. In some embodiments, the PID-to-UPID mapping store 160 may be an array that is indexed by the value of the PID 134. For example, a PID 134 having a value of 5 may be found at a fifth location (or sixth location if the PID-to-UPID mapping store 160 supports PID values of 0) within the PID-to-UPID mapping store 160. As an example, to support four million process IDs 134, using a 64-bit value for the UPID 154, 32 MB of memory 124 may be utilized. This is only an example of how the PID-to-UPID mapping store 160 may be implemented, and other techniques for mapping from the PID 134 to the UPID 154 may be utilized without deviating from the embodiments of the present disclosure. Thus, given a particular value for the PID 134, the UPID 154 may be quickly determined.

In addition to creating the PID-to-UPID mapping 162 and populating the PID-to-UPID mapping store 160, the UPID management engine 155 may create a message 180 that includes the value of the created PID 134 (e.g., PID1) and/or the value of the created UPID 154 (e.g., UPID1). The message 180 may be transmitted to the message buffer 190 for later retrieval by the application 140. Additional details for how this message 180 is handled will be provided with respect to FIG. 3.

Referring back to FIG. 1, the use of the UPID management engine 155 may allow for improved access to and/or more accurate information about, the process creation process performed by the process management engine 132. Because the UPID management engine 155 is executing in kernel space 130, it may have inline access to process creation and may be able to quickly detect the creation of new processes and their associated PIDs 134. The PID-to-UPID mapping store 160 may be relatively simple to maintain, and therefore may not require excessive computational power or memory space.

In some embodiments, PID-to-UPID mapping store 160 may be formed in a portion of memory (e.g., memory 124 of FIG. 1) that is accessible to the user space 135. For example, the PID-to-UPID mapping store 160 may be formed in a memory-mapped area that the application 140 may either directly address or address via an API. Therefore, the application 140 may be able to utilize the values of the PID-to-UPID mapping store 160 created by the UPID management engine 155.

However, while the PID-to-UPID mapping store 160 is relatively simple, the mapping from UPID to PID may be more complex. For example, since the UPID 154 may be a large number so as to be pseudo-unique (e.g., 64 bits), a lookup array that used the UPID 154 as an index may be prohibitively large, especially for execution in kernel space 130. In order to support more complex lookup techniques for the UPID-to-PID mapping, the application 140 in user space 135 may be used instead.

Figure 3:
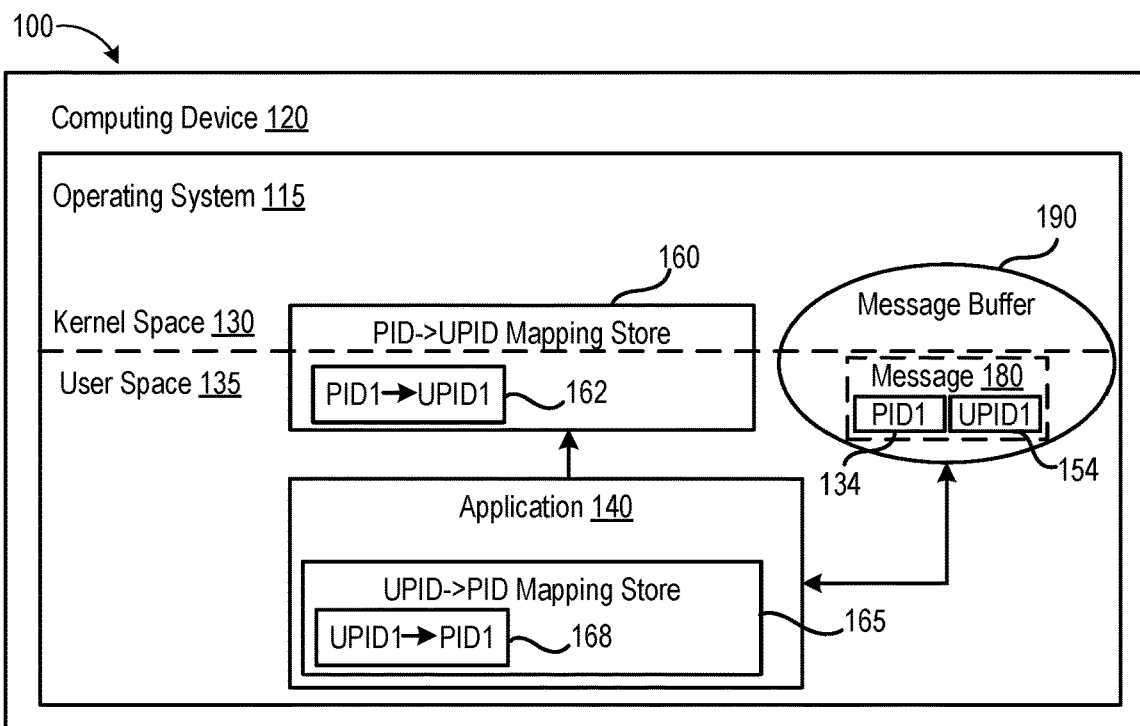
FIG. 3 is a block diagram illustrating an example of the creation of a UPID-to-PID mapping in response to the creation of a process, in accordance with some embodiments of the present disclosure.

FIG. 3 is a block diagram illustrating an example of the creation of a UPID-to-PID mapping 168 in response to the creation of a process, in accordance with some embodiments of the present disclosure. FIG. 3 is an example only, and is not intended to limit the embodiments of the present disclosure. A description of those elements of FIG. 3 that have been previously described will be omitted for brevity.

Referring to FIGS. 1 to 3, as part of an operation of the application 140 within user space 135, the application 140 may monitor the message buffer 190 for messages 180 from the application extension 150 executing in kernel space 130. As a result of this monitoring, the application 140 may detect a message 180 from the UPID management engine 155 that resulted from the creation of a UPID 154 (e.g., UPID1) that maps to a newly-created PID 134 (e.g., PID1).

Responsive to the message 180 in the message buffer 190, the application 140 may create and/or update a UPID-to-PID mapping store 165. For example, the application 140 may generate a UPID-to-PID mapping 168 that maps a UPID value 154 to a PID value 134, and place the UPID-to-PID mapping 168 within a UPID-to-PID mapping store 165. In some embodiments, the UPID-to-PID mapping 168 may allow for executing code instructions that have a value of a UPID 154 to retrieve the value of a PID 134 that corresponds to the UPID 154. In some embodiments, the UPID-to-PID mapping store 165 may be maintained separately from, and in a different format, from the PID-to-UPID mapping store 160. In some embodiments, the UPID-to-PID mapping store 165 may be a sorted tree that utilizes the UPID 154 to identify a leaf of the tree that contains the PID 134. For example, the UPID-to-PID mapping store 165 may be implemented as an AVL tree. An AVL tree (named after inventors Adelson-Velsky and Landis) is a self-balancing binary search tree (BST). In an example embodiment utilizing an AVL tree, the heights of the two child subtrees of any node of the UPID-to-PID mapping store 165 differ by at most one. If the heights of the two child subtrees differ by more than one, rebalancing may be performed on the UPID-to-PID mapping store 165 to restore this property. Lookup, insertion, and deletion to the UPID-to-PID mapping store 165 may take O(log n) time in both the average and worst cases, where n is the number of nodes in the UPID-to-PID mapping store 165 prior to the operation. Insertions and deletions may require the UPID-to-PID mapping store 165 to be rebalanced by one or more tree rotations. Thus, given a particular value for the UPID 154, the PID 134 may be quickly determined.

Though an AVL tree is described as an example for the UPID-to-PID mapping store 165, it is an example only, and not intended to limit the embodiments of the present disclosure. It will be understood that other formats, trees, or mapping mechanisms may be used for the UPID-to-PID mapping store 165 without deviating from the embodiments of the present disclosure.

In FIGS. 2 and 3, it is illustrated that the message 180 contains both a UPID 154 and a PID 134, but the embodiments of the present disclosure are not limited to this configuration. In some embodiments, the message 180 may contain only the PID 134. In such an embodiment, the application 140, upon receiving the message 180, may access the PID-to-UPID mapping store 160 to access the PID-to-UPID mapping 162 (see FIG. 2) to retrieve the associated UPID 154 for the provided PID 134. In some embodiments, the message 180 may contain the PID-to-UPID mapping 162 that was created by the UPID management engine 155 described herein, for example, by FIG. 2.

Referring back to FIG. 1, the operations of the application 140 with respect to the creation and/or maintenance of the UPID-to-PID mapping store 165 may be performed asynchronously with respect to the operations of the UPID management engine 155. Thus, the UPID management engine 155 may be able to perform time-sensitive operations related to the creation of a process 136 and an associated PID 134 so as to create a UPID 154 to track the new PID 134. The finalization of the UPID-to-PID mapping 168, which may include operations to rebalance the UPID-to-PID mapping store 165, may be performed as a lazy update, thus reducing the number of operations performed in the kernel space 130, which may be resource and/or performance sensitive.

In addition, because the maintenance of the UPID-to-PID mapping store 165 may be more complex, it may be more efficiently handled by application 140 in user space 135, rather than through the use of application extension 150 in kernel space 130. The user space 135 may have access to a more extensive array of APIs or other software executable code than may be available to the application extension 150 in the execution engine 170.

When tracking an activity of a process 136, application 140 may obtain the PID 134 of the process 136. The application 140 may access the PID-to-UPID mapping store 160 to retrieve a UPID 154 that is associated with the process 136. Even if the PID 134 of the process 136 has been reused (e.g., was previously used by a different process 136), the UPID 154 may be unique (or pseudo-unique) such that the activities of the process 136 may be uniquely tracked.

In some embodiments, the application 140 may generate process activity data 175 associated with a given process 136. The process activity data 175 may track information about activities of the process 136. For example, information about the creation of the process, activities (e.g., system calls, network access, etc.) of the process 136, other children processes 136 created by the process 136, a termination of the process 136, and the like may be collected and tracked. In some embodiments, the application 140 may receive the process activity data 175 from the application extension 150 executing in the kernel space 130 of the operating system 115. For example, the application extension 150 may utilize hooks and/or other mechanisms within the operating system 115 to capture events associated with processes 136 executing on the operating system 115. These events may be transferred to the application 140 (e.g., utilizing message buffer 190) and used to generate the process activity data 175. In some embodiments, the process activity data 175 may be generated and/or modified to include the UPID 154 that is associated with the PID 134 of the process 136. In some embodiments, the process activity data 175 may be transmitted externally to the computing device 120. The use of the pseudo-unique UPID 154 may allow for the process activity data 175 of the process 136 to be uniquely tracked with respect to other processes 136 of the computing device 120, even if PIDs 134 are reused.

Though FIG. 1 illustrates the process activity data 175 as part of the application 140, this is merely for convenience of description and is not intended to limit the embodiments of the present disclosure. In some embodiments, the process activity data 175 may be generated by other applications utilizing the UPID 154.

If the application 140 has a UPID 154 and wishes to determine which PID 134 is associated with the UPID 154, the application may access the UPID-to-PID mapping store 165 to determine a mapping (e.g., UPID-to-PID mapping 168 of FIG. 3) to the associated PID 134. In some embodiments, to avoid a race condition in which the PID 134 of the UPID-to-PID mapping 168 has been reused, the application 140 may further perform a reverse lookup against the PID-to-UPID mapping store 160 to determine if the UPID 154 still maps to the same PID 134 (e.g., has not be reused).

The system 100 may provide for an improved capability to track processes 136 in environments in which a PID 134 may be reused. For example, by creating a UPID 154 that maps to a newly created PID 134 at the time of creation (e.g., inline in the kernel space 130), a unique PID 154 may be created that may be pseudo-unique over the reasonable use of the system 100. If application 140 is tracking the execution of processes 136, it may correctly attribute operations of a given process 136 through the use of the UPID 154, even if the PID 134 of the process 136 is reused after the exit of the process 136.

As described herein, to avoid misattribution of a UPID 154, it may be useful to utilize values for the UPID 154 that are pseudo-unique. For example, it may be useful to minimize and/or reduce UPID collisions for a sufficiently large period of time. A UPID collision (a.k.a. UPID reuse) as used herein refers to an instance in which a system (e.g., system 100) generates a same UPID value that is attributed to more than one process 136. Thus, the tuple (system/UPID) may be configured to be unique during an interval such that two conditions are met.

The first condition is that the application 140 does not track two different processes 136 with the same UPID. For this, UPIDs 154 may be configured to be unique for as long as the longest running possible process 136 before the application 140 and/or system 100 restarts. For instance, if the application 140 is expected to restart at least every 3 years, then a given UPID 154 should be unique for at least 3 years.

The second condition is that external systems utilizing the UPID 154 never receive a UPID 154 that maps to two different PIDs 134 over the retention window of the external system. For example, in some embodiments, the application 140 may export the UPID 154 to external systems, such as loggers (e.g., in the cloud). In some embodiments, this may mean that the UPIDs 154 of a system 100 may be unique for between 30 days and ten years. In some cases, the operating environment for the execution engine 170 may make it difficult to meet the conditions for uniqueness (pseudo-uniqueness). For example, in an eBPF infrastructure, locking may not be available, fully-functional atomic operations (e.g., that return a value after the atomic operation is performed) may not be available, access to the system clock may not be available, and/or access to devices/interfaces that provide true randomness may not be available. For example, in some embodiments, an operating system 115 may have both a system clock, which represents "real" time, also known as wall clock time (which may be adjusted up or down by systems monitoring such time, such as a network time protocol (NTP)), and a monotonic clock, which may not be directly linked to the wall clock time but may be configured to steadily increase over the execution of the operating system 115 so as to provide a stable reference for comparison.

In some embodiments, the execution engine 170 may provide access to the monotonic clock, but not the system clock. As a result, operations in the execution engine 170 may not be able to take advantage of some techniques for generating unique values, such as atomic incrementing, locked incrementing, use of a system clock, etc. While pseudorandom values may be available to the execution engine 170, these values may be prone to reuse if the system 100 is restored to a previous state, such as in a virtual machine (VM) restore, which may cause the regeneration of an identical series of pseudorandom values. In a Linux operating system, the system clock 440 may correspond to a time of type CLOCK_REALTIME, and the monotonic clock 450 may correspond to a time of type CLOCK_BOOTTIME (which does not pause during suspension of the operating system 115) or CLOCK_MONOTONIC (which may pause during suspension of the operating system 115). These are merely examples, and other Linux infrastructure could be used instead without deviating from the embodiments of the present disclosure. For example, CLOCK_REALTIME_COARSE may be used for the system clock 440. Similarly, CLOCK_MONOTONIC_COARSE or CLOCK_MONOTONIC_RAW may be used for the monotonic clock 450. Those of ordinary skill in the art will recognize that other types of clock infrastructures may be utilized for the system clock 440 and/or the monotonic clock 450 without deviating from the embodiments of the present disclosure.

Figure 4A:
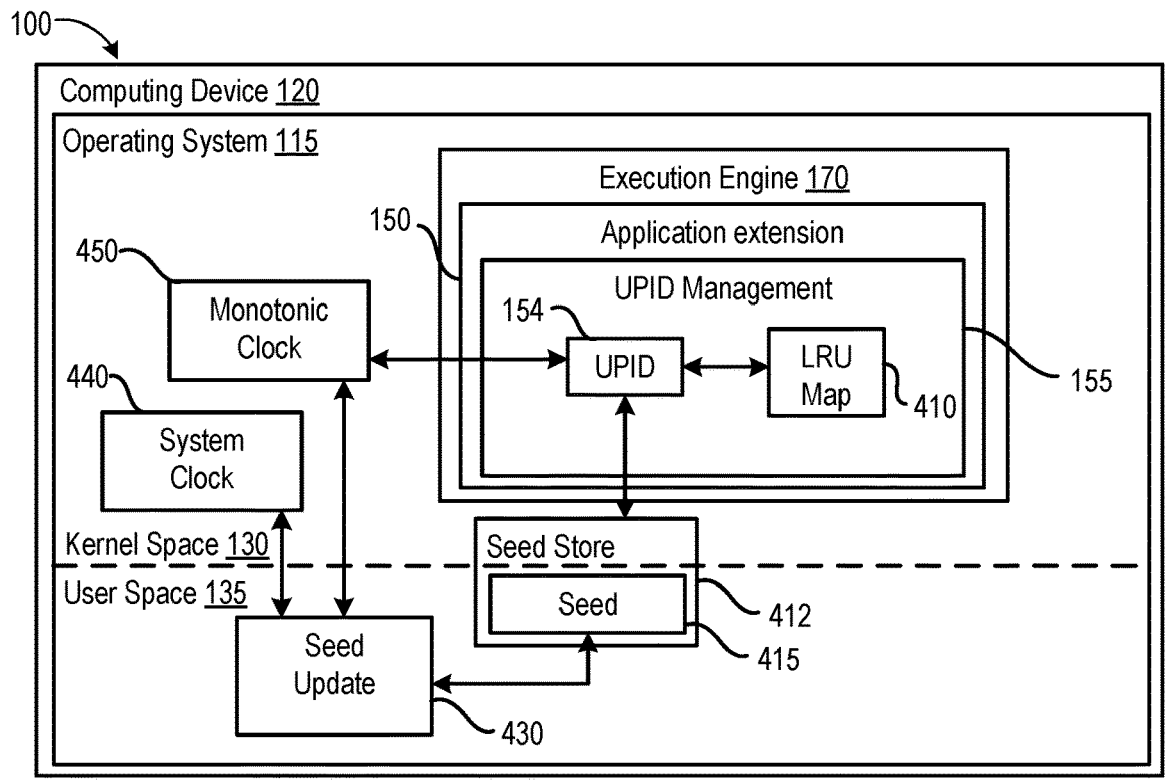
FIG. 4A is a block diagram illustrating an example of the creation of a UPID utilizing a monotonic clock, in accordance with some embodiments of the present disclosure.

Therefore, in the environment of the execution engine 170, it may be beneficial to provide algorithms which may generate UPIDs 154 without requiring access to a system clock and/or truly random values from within code executing in the kernel space 130. In some embodiments, the UPID 154 may be generated using a monotonic clock. FIG. 4A is a block diagram illustrating an example of the creation of a UPID 154 utilizing a monotonic clock 450, in accordance with some embodiments of the present disclosure. A description of elements of FIG. 4A that have been previously described will be omitted for brevity.

Referring to FIGS. 1 and 4A, the UPID management engine 155 executing within the execution engine 170 may generate the UPID 154, in part, by accessing the monotonic clock 450 of the operating system 115. As previously described, the operating system 115 may provide a monotonic clock 450 and a system clock 440. The system clock 440, which may also be referred to as a real-time clock or a wall clock, may represent an estimation of the system 100 as to the wall-clock time or time-of-day time. The system clock 440 may be adjusted during operation of the operating system 115 as the system time-of-day clock is changed, including by NTP. The monotonic clock 450 may represent elapsed time since some arbitrary, fixed point in the past, such as the booting of the operating system 115. The monotonic clock 450 may advance regularly and not affected by changes in the system clock 440 (e.g., a time-of-day clock).

In some embodiments, the UPID management engine 155 may not have access to the system clock 440. For example, if the UPID management engine 155 is executing within an eBPF infrastructure, the eBPF infrastructure may not allow access to the APIs of the operating system 115 returning values for the system clock 440. To address this absence of functionality, a timestamp may initially be generated using the monotonic clock 450. In some cases, the monotonic clock 450 may support up to nanosecond precision.

By utilizing the monotonic clock 450 in combination with the LRU map 410, a value may be generated that should not reused within the operation of the operating system 115. However, the monotonic clock 450 may have two challenges. First, the monotonic clock 450 may be reset if the operating system 115 is restarted, which may cause UPIDs 154 that are generated after the restart to collide with those UPIDs 154 previously generated. Moreover, as previously described, in some cases the operating system 115 may be checkpointed, such as in container infrastructures. In such an embodiment, the operating system 115 may be restored from the checkpoint at a different time, but with a same value of the monotonic clock 450, which can lead to collisions with later-executing processes.

To avoid such collisions, an element based on the system clock 440 may be added to the generated UPID 154. As previously noted, the UPID management engine 155 may not have direct access to the system clock 440 for regular updates. Instead, a seed update engine 430 may execute within the user space 135, and may have access to the system clock 440 (e.g., via a system call and/or API) and the monotonic clock 450. The seed update engine 430 may periodically retrieve the value of the system clock 440 and the monotonic clock 450 and generate a seed value 415 from the two values. For example, the seed value 415 may be generated as the difference between the monotonic clock 450 and the system clock 440. In some embodiments in which the monotonic clock 450 is started with the operating system 115, the difference between the monotonic clock 450 and the system clock 440 may represent an approximation of the system time at which an execution of the operating system 115 (e.g., the booting of the operating system 115), and thus UPID generation, began.

The seed update engine 430 place the value as a seed 415 into seed store 412. In some embodiments, the seed store 412 may be a portion of memory (e.g., memory 124 of FIG. 1) that is accessible by the seed update engine 430 in user space 135 and the UPID management engine 155 in kernel space 130. Therefore, the UPID management engine 155 may be able to utilize the values of the seed 415 created by the seed update engine 430. In some embodiments, the seed update engine 430 may update the seed 415 (e.g., with the difference between the monotonic clock 450 and the system clock 440) at periods of between, for example, 1 and 60 seconds. Though illustrated as a single seed 415, this is only an example, and the embodiments of the present disclosure are not limited to such a configuration. In some embodiments, the seed update engine 430 may place the retrieved values of the monotonic clock 450 and the system clock 440 into the seed store 412.

To generate the UPID 154, the UPID management engine 155 may combine the seed 415 based on the system clock 440 and the monotonic clock 450 with the value returned from current read of the monotonic clock 450. For example, the UPID management engine 155 may establish a UPID 154 as a sum of the seed 415 and a value read from the monotonic clock 450. Such a generated UPID 154 may serve as an approximation for the system clock 440 that is otherwise unavailable to the UPID management engine 155. In some embodiments, the UPID 154 may be generated as a 64-bit value, where bit 0 is the LSB and bit 63 is the MSB. For example, in some embodiments, bits 0-62 (63 bits) may be made up of 63 bits of a value generated from the sum of the return value from the monotonic clock 450 and the seed 415. In some embodiments, Bit 63 (1 bit) may be maintained as a 0, which may allow for the UPID 154 to be stored as a signed integer. If the monotonic clock 450 has nanosecond resolution, the use of 63 bits for the UPID 154 may allow for to a time period of up to approximately 292 years before rollover becomes a concern.

With nanosecond precision, there is a relatively low probability of collision across multiple processors (e.g., a same timestamp being generated by two processing devices 122 executing at the same time). However, collisions may still be possible if two processors run the code within the same nanosecond. To further guard against timestamp collisions, generated UPIDs 154 may be validated against a least recently used (LRU) map 410 with fixed size. The LRU map 410 is map incorporating a cache eviction algorithm that organizes UPIDs 154 inserted into the map in order of use. In the LRU map 410, the UPID 154 that has been least recently used may be evicted first from the LRU map 410 when new space is needed. In some embodiments, the LRU map 410 may be implemented as a hash map of keys and double linked nodes. The LRU map 410 may provide an interface for determining if the UPID 154 is already present in the LRU map 410 prior to, or during, insertion of the UPID 154 into the LRU map 410, which may allow for a collision to be detected. Since collisions are generally possible only within a very narrow time window, as long as the LRU map 410 can hold multiple seconds worth of values, the practical chance of collision is extremely low. If the UPID 154 is detected as already being present in the LRU map 410, it may mean that another processing device was simultaneously attempting to create a UPID 154 and retrieved the same value from the monotonic clock 450. In that case, the generated UPID 154 may be discarded, and another value may be retrieved from the monotonic clock 450 and another UPID 154 generated (and verified against the LRU map 410).

Figure 4B:
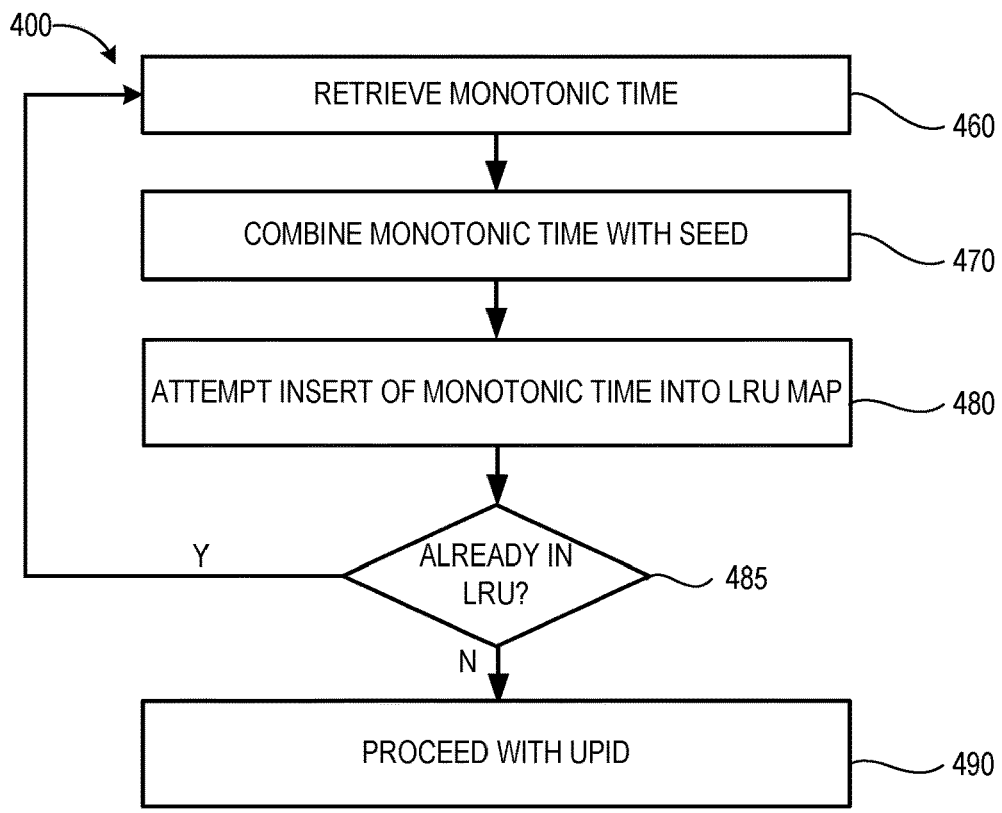
FIG. 4B is a flow diagram of a method of generating a UPID utilizing a monotonic clock according to some embodiments of the present disclosure.

FIG. 4B is a flow diagram of a method 400 of generating a UPID utilizing a monotonic clock according to some embodiments of the present disclosure. A description of elements of FIG. 4B that have been previously described will be omitted for brevity. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 400 may be performed by a computing device (e.g., computing device 120).

With reference to FIG. 4B, method 400 illustrates example functions used by various embodiments. Although specific function blocks ("blocks") are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

Referring simultaneously to FIGS. 1 and 4A as well, the method 400 begins at block 460, in which a value of monotonic time is retrieved. The value of the monotonic time may be retrieved from a monotonic clock 450 of the computing device 120. The value of the monotonic time may represent an increasing value of the monotonic clock 450 that increases regularly at some interval (e.g., 1 nanosecond). The value of the monotonic time may be retrieved by the UPID management engine 155 discussed herein with respect to FIG. 4A.

At block 470, a UPID 154 may be generated by combining the value of the monotonic time with a seed, such as the seed value 415 discussed herein with respect to FIG. 4A. In some embodiments, the seed may be updated periodically by an application (e.g., the seed update engine 430 of FIG. 4A) in user space 135 based on a value of the system clock 440 and the monotonic clock 450. In some embodiments, the seed may be a difference between values of the system clock 440 and the monotonic clock 450 when accessed by the application. In some embodiments, the UPID 154 may be a sum of the value of the monotonic time detected in block 460 and the seed.

At block 480, an attempt may be made to insert the generated UPID into an LRU map, such as the LRU map 410 of FIG. 4A. The attempt to insert the generated UPID into the LRU map 410 may indicate whether the value is already present in the LRU map 410.

At block 485, if it is determined that the value of the generated UPID is already present in the LRU map 410, the operations may revert to block 460 where another value of the monotonic time is retrieved.

At block 490, if it is determined that the value of the generated UPID is not present in the LRU map 410, the operations may proceed with use of the UPID 154 to refer to a generated PID, as discussed herein, for example, with respect to FIG. 1.

The embodiments illustrated in FIGS. 4A and 4B provide a reliable way to generate a UPID 154 by a UPID management engine 155 despite not having direct access to a system clock. Embodiments of the present disclosure may generate a pseudo-unique UPID 154 even while executing in a protected environment, such as eBPF, in kernel space 130. The use of the LRU map 410, as well as the periodically-updated seed 415, allows for a pseudo-unique UPID 154 to be generated that avoids and/or reduced UPID collisions that might be caused by system checkpointing, system restart, and/or concurrently executing processors.

As described herein, the LRU map 410 may prevent and/or reduce collision of generated UPIDs 154 that may be caused due to the execution of multiple processing devices. For example, if two processing devices (e.g., processing devices 122 of FIG. 1) attempt to generate a UPID 154 substantially simultaneously (e.g., within one nanosecond of one another), they may both access the same seed 415 and the same value from the monotonic clock 450. However, by utilizing the LRU map 410, the UPID management engine 155 may attempt to atomically place the UPID 154 in the LRU map 410. If the UPID 154 is already in the LRU map 410, it may be determined that a collision has occurred with a parallel-executing processing device, and the UPID management engine 155 may attempt to generate another UPID 154.

Figure 5:
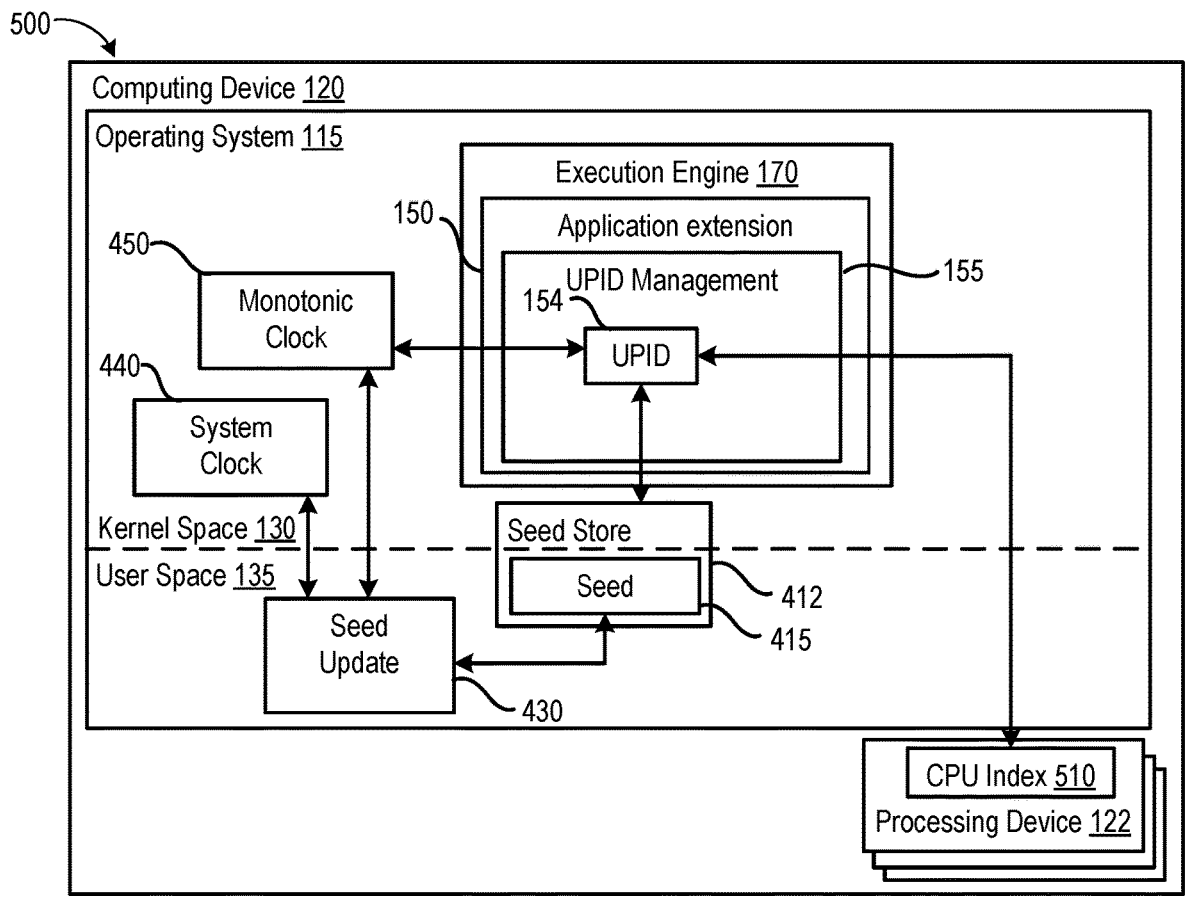
FIG. 5 is a block diagram illustrating a system incorporating another example of the creation of a UPID utilizing a monotonic clock, in accordance with some embodiments of the present disclosure.

FIG. 5 is a block diagram illustrating a system 500 incorporating another example of the creation of a UPID 154 utilizing a monotonic clock 450, in accordance with some embodiments of the present disclosure. A description of elements of FIG. 5 that have been previously described will be omitted for brevity. The embodiment of FIG. 5 illustrates an embodiment that may be used an alternative to, or in addition to, embodiments previously described.

In some embodiments, the LRU map 410 of FIGS. 4A and 4B may be replaced by operations utilizing a central processing unit (CPU) index 510, which may also be referred to herein as a processing device index 510. The CPU index 510 may be a unique number that identifies a processing device (e.g., processing device 122 of FIG. 1) among a plurality of processing devices 122 of a computing device 120. Each of the processing devices 122 may have their own individual CPU index 510 that may be accessible to instruction codes executing on the processing device 122.

Referring to FIG. 5, a timestamp may be generated similarly to the process described herein with respect to FIGS. 4A and 4B. For example, a value for the monotonic clock 450 may be accessed by the UPID management engine 155 and combined (e.g., summed) with the seed 415 from the seed store 412. As previously described, the seed 415 of the seed store 412 may be a difference between values of the monotonic clock 450 and the system clock 440 that may be periodically updated by a seed update engine 430 executing in the user space 135 of the operating system 115, which may have access to the system clock 440. Rather than submitting the generated value to an LRU map, as described herein with respect to FIGS. 4A and 4B, the CPU index 510 may be retrieved by the UPID management engine 155, and bits of the value generated from the seed 415 and the value of the monotonic clock 450 may be replaced with the CPU index 510 to generate the UPID 154.

For example, 10 bits of 64 bits of the UPID 154 may include the CPU index 510 of the processing device 122 that was used to create the UPID 154. By incorporating the CPU index 510 into the UPID 154, a UPID collision between two processing devices 122 that access the same value from the monotonic clock 450 may be avoided, since UPIDs 154 generated by different processing devices 122 will have different CPU indexes 510 and thus different generated UPIDs 154.

The number of bits of the UPID 154 that are dedicated to the CPU index 510 may impact the number of processing devices 122 that may be supported. For example, ten bits may support up to 1024 processing devices 122. However, reducing the number of bits of the UPID 154 to contain the generated timestamp (e.g., the combination of the values from the monotonic clock 450 and the seed 415) may reduce the amount of time before the generated timestamp will rollover. However, the use of the CPU index 510 may avoid the use of memory for the LRU map 410 of FIG. 4A.

Figure 6A:
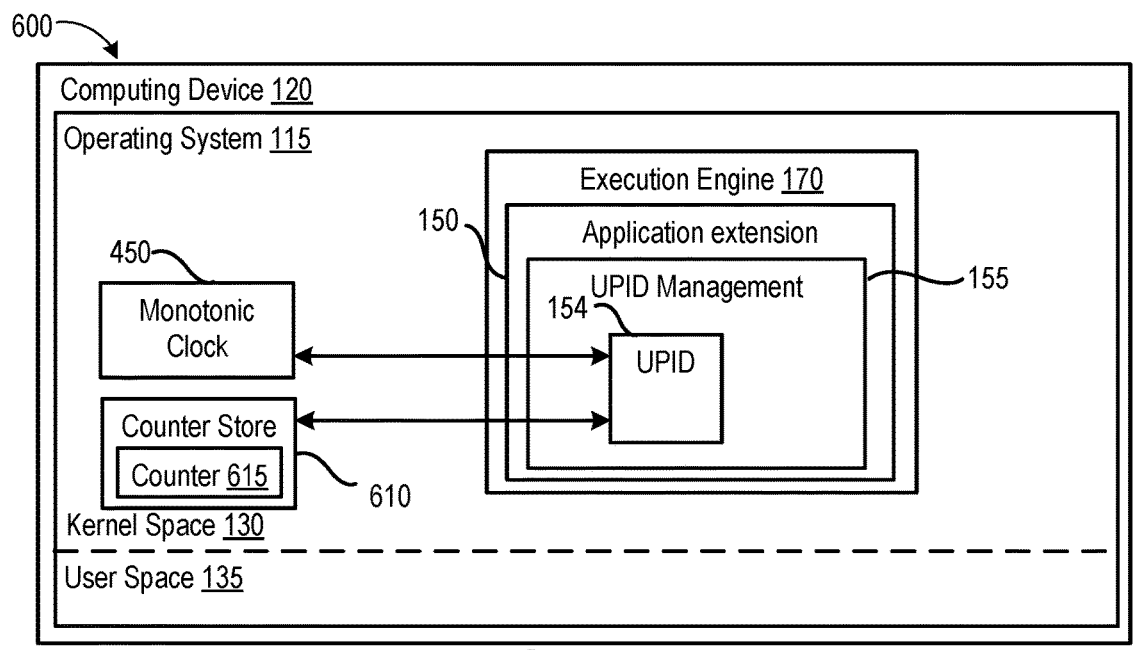
FIG. 6A is a block diagram illustrating a system incorporating another example of the creation of a UPID utilizing a monotonic clock and a counter, in accordance with some embodiments of the present disclosure.

FIG. 6A is a block diagram illustrating a system 600 incorporating another example of the creation of a UPID 154 utilizing a monotonic clock 450 and a counter 615, in accordance with some embodiments of the present disclosure. A description of elements of FIG. 6A that have been previously described will be omitted for brevity. The embodiment of FIG. 6A illustrates an embodiment that may be used an alternative to, or in addition to, embodiments previously described.

Referring to FIG. 6A, a system 600 may incorporate a UPID management engine 155 executing within an application extension 150 that executes as part of an environment provided by execution engine 170 within the kernel space 130 of an operating system 115 of a computing device 120. The UPID management engine 155 may generate a UPID 154 to be associated with a PID of a process executing within the operating system 115, as described herein with respect to FIG. 1.

The UPID management engine 155 may generate the UPID 154 from a combination of a value from a monotonic clock 450 and a counter 615 that is stored in a counter store 610. The counter store 610 may be provided from memory (e.g., memory 124 of FIG. 1) or a storage device (e.g., storage device 126 of FIG. 1).

The UPID management engine 155 may generate the UPID 154 using an algorithm similar to those described herein, with some modifications. For example, rather than use the seed 415 in combination with a value from a monotonic clock 450, as described herein with respect to FIGS. 4A, 4B, and 5, the value from the monotonic clock 450 may be combined with the counter 615. For example, a subset of the bits of the UPID 154 may include the value from a monotonic clock 450 and a subset of the bits of the UPID 154 may include the value of the counter 615. The counter 615 may be atomically incremented when used for the UPID 154 to avoid collision with other executing processing devices (e.g., processing device 122 of FIG. 1) of the computing device 120.

For example, in an example UPID 154 having 64 bits, 38 bits may be used for the incrementing counter 615, and 25 bits may be used for the value accessed from the monotonic clock 450. In some embodiments, as described herein, one bit (e.g., an MSB) of the UPID 154 may be left as 0 to be stored as a signed integer. The use of 38 bits for the counter may still provide a long duration before the counter 615 rolls over and collision may be possible. For example, even with the creation of 1000 new processes a second, a 38-bit counter may extend for over 8 years before rolling over, which may be sufficient for pseudo-uniqueness.

The use of 25 bits of the value from the monotonic clock 450 may provide an approximate 1 in 32 million chance of collision for the value retrieved from the monotonic clock 450 which may decrease a chance of collision if the operating system 115 is restored from a checkpoint (e.g., on a VM restore). In embodiments of the present disclosure utilizing eBPF, the execution engine 170 may be denied access to the time-stamp counter (TSC) of the processing device. In such embodiments on Linux-based operating system, other time-based calls (e.g., ktime_get_ns( ) or a function, such as bpf_ktime_get_ns( ) that wraps ktime_get_ns( ), may be utilized to get the value from the monotonic clock 450.

In some embodiments, the counter 615 may be atomically incremented and maintained in the counter store 610. This may allow for the counter 615 to be loaded and the creation of UPIDs 154 to continue without collision even if the UPID management engine 155 is restarted. For example, upon restart, the UPID management engine 155 may access the current value of the counter 615 from the counter store 610 and restart the generation of the UPIDs 154 from the previously-stored value.

In order to avoid collision between concurrently-executing processing devices, the increment of the counter 615 may be atomic. In some eBPF-based embodiments, a fully supported implementation of atomic operations may not be available to the UPID management engine 155 due to the types of operations that are allowed in the execution engine 170. For example, the execution engine may allow for an atomic increment, but may not return the updated value as part of the operation, which may allow processes on concurrently-executing processing devices to read the same value. In such embodiments, it may be useful to determine if a collision has occurred.

To avoid this situation, the following algorithm may be used:

```
loop (up to a fixed iteration count) {
    val = counter;
    atomic_inc(counter);
    if (counter == val + 1) {
        break;
    }
}
```

The above algorithm may retrieve the value of the counter 615 and then perform an atomic increment of the counter 615. After the increment, the counter 615 may be read again and compared to the previously-saved (val) version of the counter 615. If the difference is not 1, then a collision has occurred, and the attempted increment can be repeated for at most a particular number of times (fixed iteration count).

Referring to the above algorithm, if no other process incremented the counter 615 between reading the counter 615 and incrementing the counter 615 (difference is 1), then a unique value is guaranteed, and the loop can be exited. If instead there was a race condition and two processes got the same value from the counter 615, then both of the processes will retry, and one is likely to win the race. Because the code utilizes relatively few processing resources, the iteration count can be large without significant performance overhead. Further, even if two processes get the same value for the counter 615 value repeatedly, the use of the value of the monotonic clock 45 also as part of the UPID 154 significantly reduces the chance of a full collision.

Figure 6B:
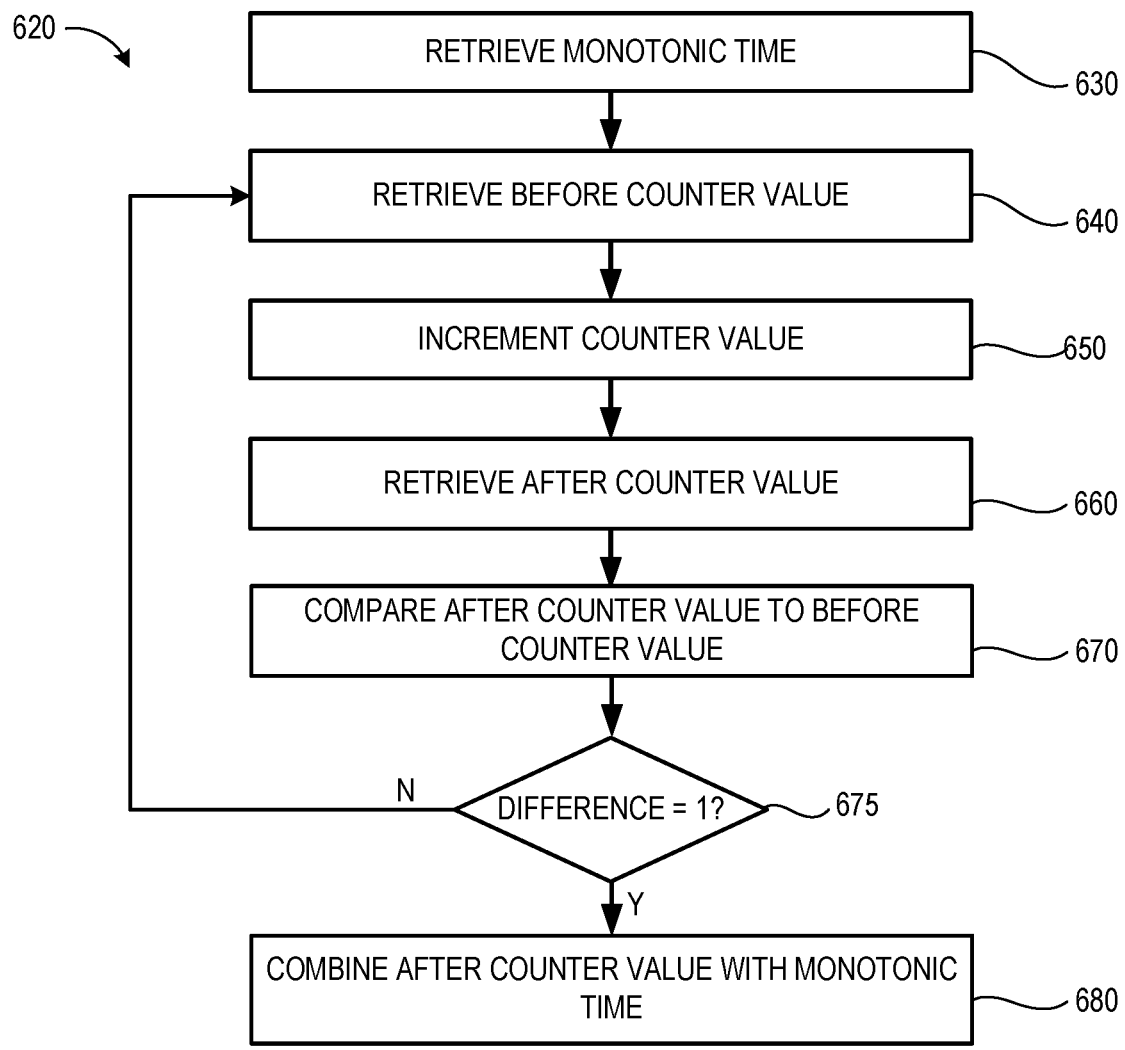
FIG. 6B is a flow diagram of a method of generating a UPID utilizing a monotonic clock according to some embodiments of the present disclosure.

FIG. 6B is a flow diagram of a method 620 of generating a UPID utilizing a monotonic clock according to some embodiments of the present disclosure. A description of elements of FIG. 6B that have been previously described will be omitted for brevity. Method 620 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 620 may be performed by a computing device (e.g., computing device 120).

With reference to FIG. 6B, method 620 illustrates example functions used by various embodiments. Although specific function blocks ("blocks") are disclosed in method 620, such blocks are examples. That is, embodiments are well suited to performing various other blocks or variations of the blocks recited in method 620. It is appreciated that the blocks in method 620 may be performed in an order different than presented, and that not all of the blocks in method 620 may be performed.

Referring simultaneously to FIGS. 1 and 6A as well, the method 620 begins at block 630, in which a value of monotonic time is detected. The value of the monotonic time may be retrieved from a monotonic clock 450 of the computing device 120. The value of the monotonic time may represent an increasing value of the monotonic clock 450 that increases regularly at some interval (e.g., 1 nanosecond). The value of the monotonic time may be retrieved by the UPID management engine 155 discussed herein with respect to FIG. 6A.

At block 640, a before counter value may be retrieved. For example, the counter 615 from counter store 610 may be retrieved. In some embodiments, the counter store 610 may be stored in memory of the computing device 120. In some embodiments, the counter 615 may be stored in persistent (e.g., non-volatile) storage of the computing device 120 and may be loaded into memory when the UPID management engine 155 is loaded.

At block 650, the counter value may be incremented. For example, the counter 615 from counter store 610 may be incremented. In some embodiments, the incrementing operation may be an atomic operation.

At block 660, an after counter value may be retrieved. For example, the counter 615 from counter store 610 may be retrieved.

At block 670, the after counter value retrieved in block 660 may be compared to the before counter value retrieved in block 640. For example, a difference between the before counter value and the after counter value may be calculated.

At block 675, if it is determined that the difference between the before counter value and the after counter value is not equal to one the operation may revert to block 640 to begin the operation of incrementing and accessing the counter again.

At block 680, if it is determined that the difference between the before counter value and the after counter value is equal to one, the after counter value may be combined with the value from the monotonic clock 450 retrieved in block 630 to generate the UPID 154.

The embodiments illustrated in FIGS. 6A and 6B provide a reliable way to generate a UPID 154 by a UPID management engine 155 despite not having direct access to a system clock or fully-functional atomic operations such as "atomic increment and return value" (e.g., _sync_add_and_fetch( ) or _sync_fetch_and_add( ). Embodiments of the present disclosure may generate a reliable UPID 154 even while executing in a protected environment, such as eBPF, in kernel space 130. The use of the counter 615 along with the values from the monotonic clock 450 allows for a pseudo-unique UPID 154 to be generated that avoids UPID collisions that might be caused by system checkpointing, system restart, and/or concurrently executing processors. In some embodiments, the counter 615 may be periodically saved, such as to storage device 126 (see FIG. 1), and the value for the counter 615 may be initialized from the persisted value (e.g., when the application extension 150 is initialized).

Figure 7:
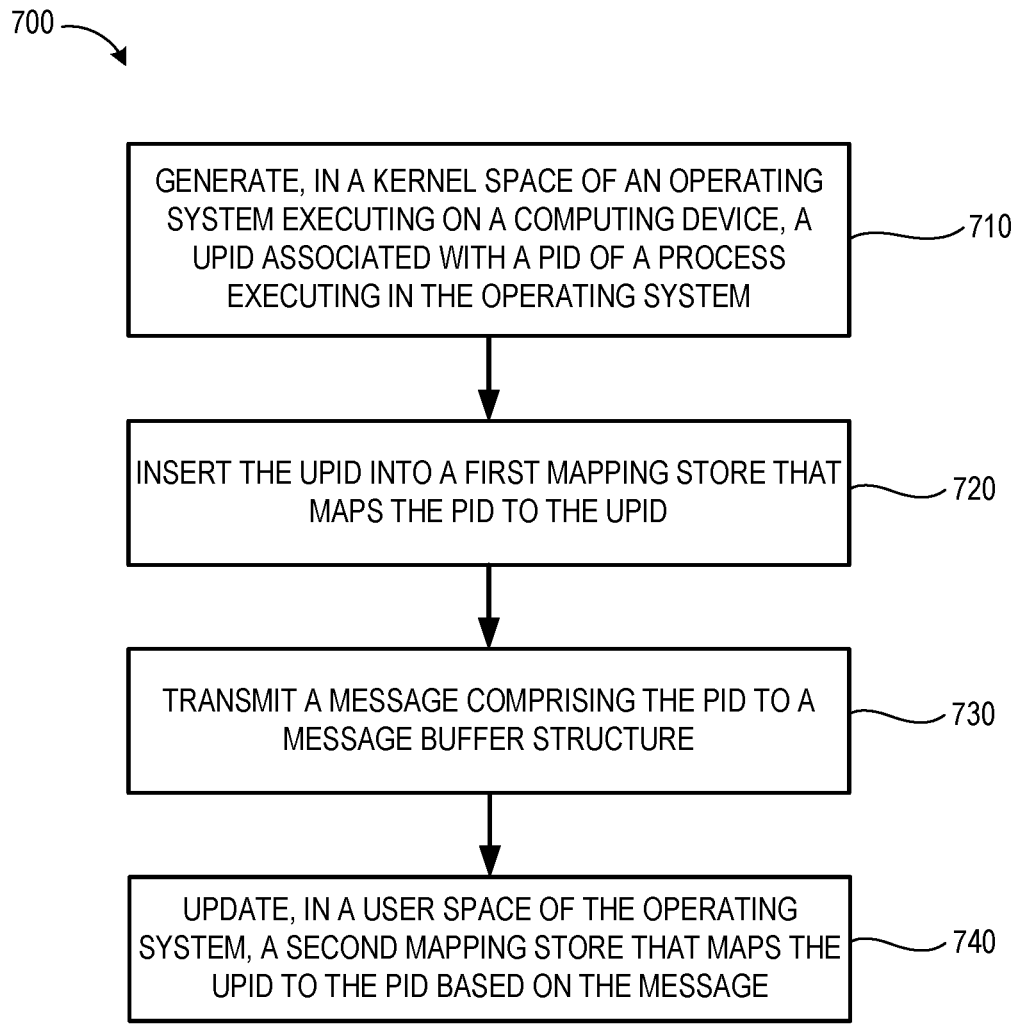
FIG. 7 is a flow diagram of a method of tracking processes in an operating system, according to some embodiments of the present disclosure.

FIG. 7 is a flow diagram of a method 700 of tracking processes in an operating system, according to some embodiments of the present disclosure. A description of elements of FIG. 7 that have been previously described will be omitted for brevity. Method 700 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 700 may be performed by a computing device (e.g., computing device 120).

With reference to FIG. 7, method 700 illustrates example functions used by various embodiments. Although specific function blocks ("blocks") are disclosed in method 700, such blocks are examples. That is, embodiments are well suited to performing various other blocks or variations of the blocks recited in method 700. It is appreciated that the blocks in method 700 may be performed in an order different than presented, and that not all of the blocks in method 700 may be performed.

Referring simultaneously to FIGS. 1 to 6 as well, the method 700 begins at block 710, in which a UPID associated with a PID of a process executing in an operating system is generated in a kernel space of the operating system executing on a computing device. The UPID and PID may be similar to UPID 154 and PID 134 described herein. The kernel space may be similar to kernel space 130 of an operating system 115 of a computing device 120, as described herein with respect to FIGS. 1 to 6. In some embodiments, the method 700 may further include generating the UPID responsive to detecting a creation of the process in the kernel space of the operating system. In some embodiments, the UPID is generated by an application extension executing in an extended Berkeley packet filter (eBPF) infrastructure within the operating system of the computing device. In some embodiments, the UPID is generated based on a monotonic clock of the computing device.

At block 720, UPID is inserted into a first mapping store that maps the PID to the UPID. The first mapping store may be similar to the PID-to-UPID mapping store 160 described herein with respect to FIGS. 1 and 2. In some embodiments, the first mapping store comprises a memory structure shared between the kernel space and the user space of the operating system.

At block 730, a message is transmitted comprising the PID to a message buffer structure. The message buffer structure may be similar to the message buffer 190 described herein with respect to FIGS. 1 to 3.

At block 740 a second mapping store that maps the UPID to the PID based on the message may be updated in a user space of the operating system. The second mapping store may be similar to the UPID-to-PID mapping store 165 described herein with respect to FIGS. 1 and 3. The user space may be similar to user space 135 of the operating system 115 of the computing device 120, as described herein with respect to FIGS. 1 to 6. In some embodiments, the first mapping store is maintained separately from, and in a different format than, the second mapping store.

In some embodiments, the process is a first process, the PID is a first PID, and the UPID is a first UPID. The method 700 may further include generating, in the kernel space of the operating system, a second UPID associated with a second process having a second PID executing in the operating system. The second UPID may be different from the first UPID and the first PID may be equal to the second PID.

In some embodiments, the process is a first process, the PID is a first PID, and the UPID is a first UPID. The operations may further include collecting process activity associated with a second process in the user space of the operating system, the second process having a second PID, accessing the first mapping store to determine a second UPID mapped to the second PID, and generating a transmission including the process activity and the UPID.

Figure 8:
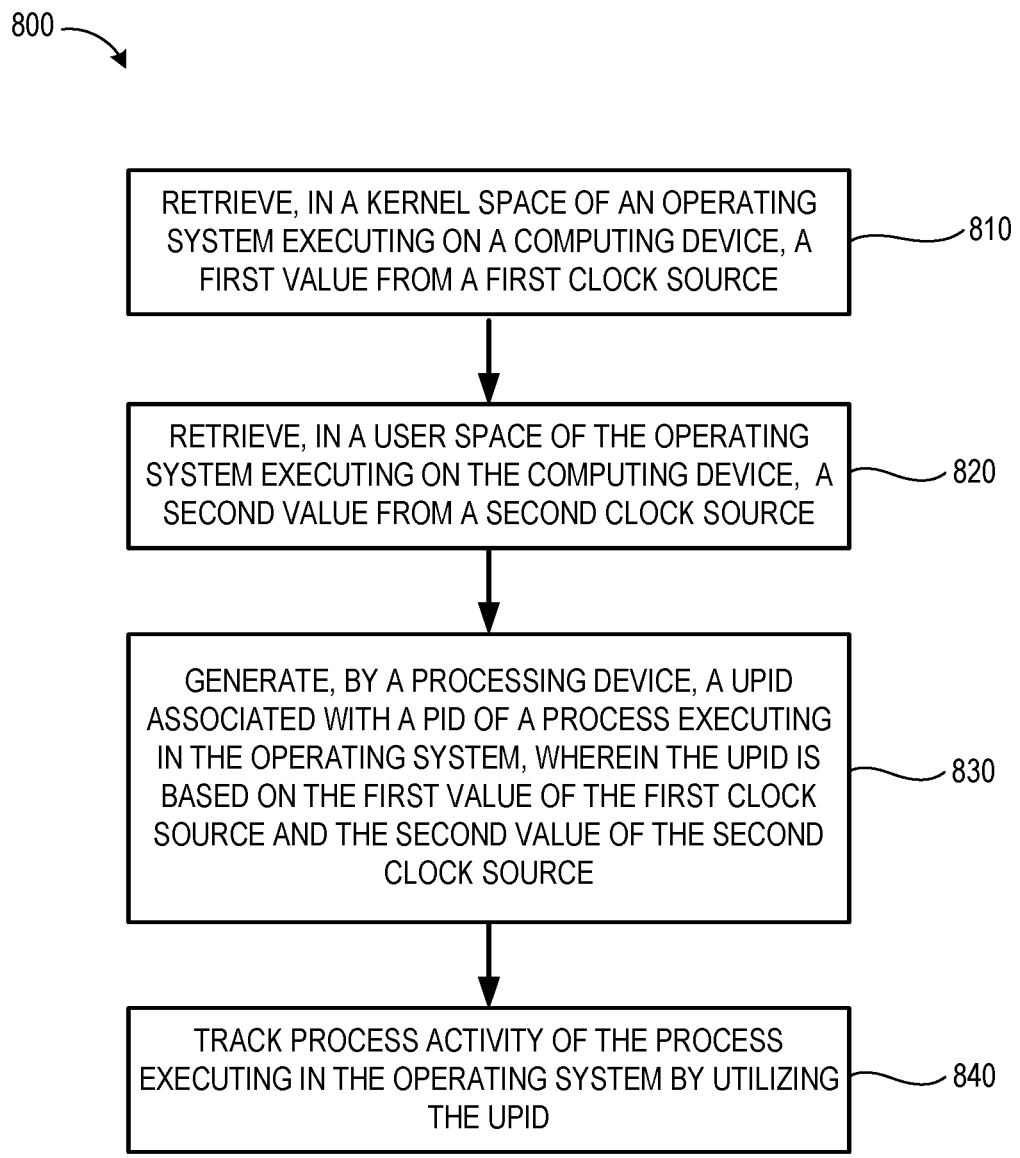
FIG. 8 is a flow diagram of a method of generating a UPID, according to some embodiments of the present disclosure.

FIG. 8 is a flow diagram of a method of generating a UPID, in accordance with some embodiments of the present disclosure. Method 800 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 800 may be performed by a computing device (e.g., computing device 120).

With reference to FIG. 8, method 800 illustrates example functions used by various embodiments. Although specific function blocks ("blocks") are disclosed in method 800, such blocks are examples. That is, embodiments are well suited to performing various other blocks or variations of the blocks recited in method 800. It is appreciated that the blocks in method 800 may be performed in an order different than presented, and that not all of the blocks in method 800 may be performed.

Referring simultaneously to the prior figures as well, the method 800 begins at block 810, in which a first value is retrieved from a first clock source in a kernel space of an operating system executing on a computing device. The kernel space may be similar to kernel space 130 of an operating system 115 of a computing device 120, as described herein with respect to FIGS. 1 to 6. The first clock source may be similar to the monotonic clock 450 described herein with respect to FIGS. 4A to 6.

At block 820, a second value is retrieved from a second clock source in a user space of the operating system executing on the computing device. The second clock source may be similar to the system clock 440 described herein with respect to FIGS. 4A to 6.

In some embodiments, retrieving the second value of the second clock source is performed periodically, and the method 800 further includes updating a seed within a seed store based on the second value of the second clock source. In some embodiments, the seed and the seed store may be similar to seed 415 and seed store 412, respectively, described herein with respect to FIGS. 4A, 4B, and 5. In some embodiments, updating the seed within the seed store based on the second value of the second clock source includes retrieving, in the user space of the operating system, a third value from the second clock source and updating the seed within the seed store based on a difference between the second value and the third value from the second clock source. In some embodiments, generating the UPID includes generating a sum of the first value of the first clock source and the seed. In some embodiments, the seed store includes a memory structure shared between the kernel space and the user space of the operating system.

At block 830, a UPID is generated associated with a PID of a process executing in the operating system. The UPID is based on the first value of the first clock source and the second value of the second clock source. The UPID and PID may be similar to UPID 154 and PID 134 described herein. In some embodiments, the UPID is generated by an application extension executing in an eBPF infrastructure within the operating system of the computing device.

At block 840, process activity of the process executing in the operating system is tracked by utilizing the UPID. The process activity may be similar to process activity 175 described herein. For example, block 840 can include receiving, by application 140, messages 180 or other messages from application extension 150, the information representing process activity 175. The information can be received via a message buffer structure 190. Block 840 can include recording at least some of the information in a tangible computer-readable storage medium. In some embodiments, the process activity may be transmitted to systems that are external to the computing device 120.

In some embodiments, the method 800 further includes retrieving a processing device index from the processing device and generating the UPID further based on the processing device index. The processing device index may be similar to the CPU index 510 described herein with respect to FIG. 5.

In some embodiments, method 800 may further include determining if the UPID is present in a least recently used (LRU) map of the operating system and responsive to determining that the UPID is present in the LRU map, retrieving, in the kernel space of the operating system, a third value from the first clock source and generating an additional UPID based on the third value of the first clock source and the second value of the second clock source.

Figure 9:
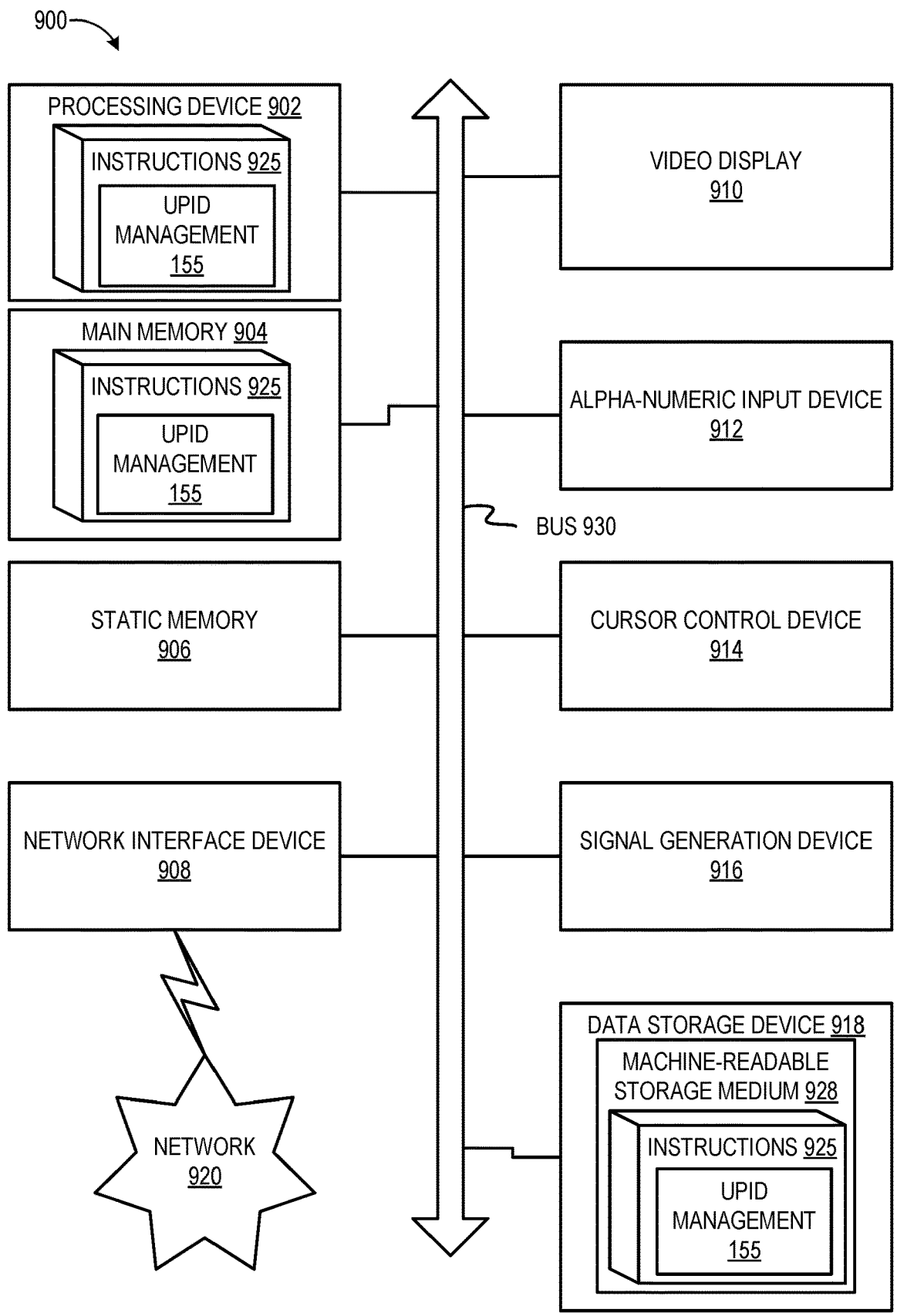
FIG. 9 is a block diagram of an example computing device that may perform one or more of the operations described herein, in accordance with embodiments of the disclosure.

FIG. 9 is a block diagram of an example computing device 900 that may perform one or more of the operations described herein, in accordance with some embodiments of the disclosure. Computing device 900 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 900 may include a processing device (e.g., a general-purpose processor, a PLD, etc.) 902, a main memory 904 (e.g., synchronous dynamic random-access memory (DRAM), read-only memory (ROM)), a static memory 906 (e.g., flash memory) and a data storage device 918, which may communicate with each other via a bus 930.

Processing device 902 may be provided by one or more general-purpose processing devices such as a microprocessor, central processing unit, or the like. In an illustrative example, processing device 902 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 902 may also include one or more special-purpose processing devices such as an application specific integrated circuit (ASIC), a field programmable gate array (FPGA), a digital signal processor (DSP), network processor, or the like. The processing device 902 may execute the operations described herein, in accordance with one or more aspects of the present disclosure, for performing the operations and steps discussed herein.

Computing device 900 may further include a network interface device 908 which may communicate with a network 920. The computing device 900 also may include a video display unit 910 (e.g., a liquid crystal display (LCD) or a cathode ray tube (CRT)), an alphanumeric input device 912 (e.g., a keyboard), a cursor control device 914 (e.g., a mouse) and an acoustic signal generation device 916 (e.g., a speaker). In one embodiment, video display unit 910, alphanumeric input device 912, and cursor control device 914 may be combined into a single component or device (e.g., an LCD touch screen).

Data storage device 918 may include a computer-readable storage medium 928 on which may be stored one or more sets of instructions 925 that may include instructions for application 140 and/or an application extension 150 for carrying out the operations associated with UPID management described herein, in accordance with one or more aspects of the present disclosure. Instructions 925 may also reside, completely or at least partially, within main memory 904 and/or within processing device 902 during execution thereof by computing device 900, main memory 904 and processing device 902 also constituting computer-readable media. The instructions 925 may further be transmitted or received over a network 920 via network interface device 908.

While computer-readable storage medium 928 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding, or carrying a set of instructions for execution by the machine and that cause the machine to perform the methods described herein. The term "computer-readable storage medium" shall accordingly be taken to include, but not be limited to, solid-state memories, optical media, and magnetic media.

Unless specifically stated otherwise, terms such as "generating," "inserting," "transmitting," "updating," "retrieving," "collecting," "accessing," "tracking," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general-purpose computing device selectively programmed by a computer program stored in the computing device. Such a computer program may be stored in a computer-readable non-transitory storage medium.

The methods and illustrative examples described herein are not inherently related to any particular computer or other apparatus. Various general-purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting. As used herein, the term "and/or" includes any and all combinations of one or more of the associated listed items.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. § 112(f), for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the present embodiments to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the present embodiments are not to be limited to the details given herein, but may be modified within the scope and equivalents of the appended claims.

What is claimed is:

1. A method comprising:
retrieving, in a kernel space of an operating system executing on a computing device, a first value from a first clock source;
retrieving, in a user space of the operating system executing on the computing device, a second value from a second clock source, wherein the retrieving the second value of the second clock source is performed periodically;
updating a seed within a seed store based on the second value of the second clock source;
generating, by a processing device, a unique process identifier (UPID) associated with a process identifier (PID) of a process executing in the operating system, wherein the UPID is based on the first value of the first clock source and the second value of the second clock source; and
tracking process activity of the process executing in the operating system by utilizing the UPID.

2. The method of claim 1, further comprising:
determining if the UPID is present in a least recently used (LRU) map of the operating system; and
responsive to determining that the UPID is present in the LRU map:
retrieving, in the kernel space of the operating system, a third value from the first clock source; and
generating an additional UPID based on the third value of the first clock source and the second value of the second clock source.

3. The method of claim 1, wherein updating the seed within the seed store based on the second value of the second clock source comprises:
retrieving, in the user space of the operating system, a third value from the second clock source; and
updating the seed within the seed store based on a difference between the second value and the third value from the second clock source.

4. The method of claim 1, wherein generating the UPID comprises generating a sum of the first value of the first clock source and the seed.

5. The method of claim 1, wherein the seed store comprises a memory structure shared between the kernel space and the user space of the operating system, and
wherein the UPID is generated by an application extension executing in an extended Berkeley packet filter (eBPF) infrastructure within the operating system of the computing device.

6. The method of claim 1, further comprising:
retrieving a processing device index from the processing device; and
generating the UPID further based on the processing device index.

7. A system comprising:
a memory; and
a processing device, operatively coupled to the memory, to:
retrieve, in a kernel space of an operating system executing on a computing device, a first value from a first clock source;
retrieve, in a user space of the operating system executing on the computing device, a second value from a second clock source, wherein the retrieval of the second value of the second clock source is performed periodically;
update a seed within a seed store based on the second value of the second clock source;
generate a unique process identifier (UPID) associated with a process identifier (PID) of a process executing in the operating system, wherein the UPID is based on the first value of the first clock source and the second value of the second clock source; and
track process activity of the process executing in the operating system by utilizing the UPID.

8. The system of claim 7, wherein the processing device is further to:
determine if the UPID is present in a least recently used (LRU) map of the operating system; and
responsive to determining that the UPID is present in the LRU map:
retrieve, in the kernel space of the operating system, a third value from the first clock source; and
generate an additional UPID based on the third value of the first clock source and the second value of the second clock source.

9. The system of claim 7, wherein to update the seed within the seed store based on the second value of the second clock source the processing device is to:
retrieve, in the user space of the operating system, a third value from the second clock source; and
update the seed within the seed store based on a difference between the second value and the third value from the second clock source.

10. The system of claim 7, wherein to generate the UPID the processing device is to generate a sum of the first value of the first clock source and the seed.

11. The system of claim 7, wherein the seed store comprises a memory structure shared between the kernel space and the user space of the operating system, and
wherein the UPID is generated by an application extension executing in an extended Berkeley packet filter (eBPF) infrastructure within the operating system of the computing device.

12. The system of claim 8, wherein the processing device is further to:
retrieve a processing device index from the processing device; and
generate the UPID further based on the processing device index.

13. A non-transitory computer-readable storage medium including instructions that, when executed by a processing device, cause the processing device to:
retrieve, in a kernel space of an operating system executing on a computing device, a first value from a first clock source;
retrieve, in a user space of the operating system executing on the computing device, a second value from a second clock source, wherein the retrieval of the second value of the second clock source is performed periodically;
update a seed within a seed store based on the second value of the second clock source;
generate a unique process identifier (UPID) associated with a process identifier (PID) of a process executing in the operating system, wherein the UPID is based on the first value of the first clock source and the second value of the second clock source; and
track process activity of the process executing in the operating system by utilizing the UPID.

14. The non-transitory computer-readable storage medium of claim 13, wherein the instructions further cause the processing device to:
- determine if the UPID is present in a least recently used (LRU) map of the operating system; and
- responsive to determining that the UPID is present in the LRU map:
  - retrieve, in the kernel space of the operating system, a third value from the first clock source; and
  - generate an additional UPID based on the third value of the first clock source and the second value of the second clock source.

15. The non-transitory computer-readable storage medium of claim 13, wherein to update the seed within the seed store based on the second value of the second clock source the processing device is to:
- retrieve, in the user space of the operating system, a third value from the second clock source; and
- update the seed within the seed store based on a difference between the second value and the third value from the second clock source.

16. The non-transitory computer-readable storage medium of claim 13, wherein to generate the UPID the processing device is to generate a sum of the first value of the first clock source and the seed.

17. The non-transitory computer-readable storage medium of claim 13, wherein the instructions further cause the processing device to:
- retrieve a processing device index from the processing device; and
- generate the UPID further based on the processing device index.

* * * * *